US012780971B2

(12) United States Patent
Tao

(10) Patent No.: US 12,780,971 B2
(45) Date of Patent: Nov. 3, 2026

(54) CURABLE RESIN COMPOSITION FOR DECORATION FILM, DECORATION FILM AND MOLDED DECORATION FILM ARTICLE

(71) Applicant: BenQ Materials Corporation, Taoyuan (TW)

(72) Inventor: Tsun-Sheng Tao, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 800 days.

(21) Appl. No.: 18/335,089

(22) Filed: Jun. 14, 2023

(65) Prior Publication Data

US 2024/0158558 A1 May 16, 2024

(30) Foreign Application Priority Data

Nov. 14, 2022 (TW) .................................. 111143405

(51) Int. Cl.
*C08F 265/06* (2006.01)
*C09D 151/00* (2006.01)

(52) U.S. Cl.
CPC ........ *C08F 265/06* (2013.01); *C09D 151/003* (2013.01)

(58) Field of Classification Search
None
See application file for complete search history.

(56) References Cited

U.S. PATENT DOCUMENTS

| | | | | |
|---|---|---|---|---|
| 6,355,703 | B1 * | 3/2002 | Baba | C08F 265/04 522/182 |
| 6,759,121 | B2 * | 7/2004 | Alahapperuma | C08L 2666/14 428/343 |
| 7,375,144 | B2 * | 5/2008 | Gilmer | C08F 222/102 522/182 |
| 7,763,670 | B2 * | 7/2010 | Kessel | C09D 4/00 522/74 |
| 8,940,813 | B2 * | 1/2015 | Araki | C09D 11/101 524/588 |
| 11,795,350 | B2 * | 10/2023 | Okamoto | B32B 27/322 |
| 2008/0258120 | A1 * | 10/2008 | Yang | B05D 3/0209 427/532 |
| 2011/0003266 | A1 * | 1/2011 | Karim | A61K 6/887 522/104 |

FOREIGN PATENT DOCUMENTS

| | | | | |
|---|---|---|---|---|
| CN | 101293440 | A | | 10/2008 |
| CN | 107057555 | A | | 8/2017 |
| JP | S6270465 | A | * | 3/1987 |
| JP | 2004330431 | A | * | 11/2004 |

OTHER PUBLICATIONS

Wikipedia contributors, “Poly(methyl methacrylate),” Wikipedia, The Free Encyclopedia, https://en.wikipedia.org/w/index.php?title=Poly(methyl_methacrylate)&oldid=1356586291 (accessed May 29, 2026). (Year: 2003).*

* cited by examiner

*Primary Examiner* — Sanza L. McClendon

(57) ABSTRACT

The present invention is to provide a curable resin composition for decoration film. The curable resin composition for decoration film comprises a (meth)acrylic resin, a reactive (meth)acrylate composition, a first initiator and a second initiator. The first initiator is photoinitiator and the second initiator is peroxide, azo compound or the combination thereof. Wherein the second initiator is present at an amount of 3 to 23 parts by weight relative to per 100 parts by weight of reactive (meth)acrylate composition and a ratio of the first initiator to the second initiator is in the range of 1:0.5 to 1:5. The curable resin composition for decoration film of the present invention provides a great molding ability and the molded decoration film article formed by curing and molding the curable resin composition has satisfied hardness and excellent chemical resistance.

13 Claims, No Drawings

CURABLE RESIN COMPOSITION FOR DECORATION FILM, DECORATION FILM AND MOLDED DECORATION FILM ARTICLE

CROSS-REFERENCE TO RELATED APPLICATION

This application claims the priority benefit of Taiwanese application serial No. 111143405, filed on, Nov. 14, 2022, which is incorporated herein by reference.

BACKGROUND OF THE INVENTION

Field of the Invention

The present invention relates to a curable resin composition for decoration film, and particularly relates to a curable resin composition for decoration film with great molding ability, and the molded decoration article formed by curing the curable resin composition has satisfied hardness and excellent chemical resistance.

Background of the Invention

Recently, it's desired for plastic injection molded product, such as mobile phone body, computer case, car interior panel etc., to have complex design and the property of not being damaged easily. The decoration film can satisfy the need of more complex design and pattern compare to the known plain manufacturing process and decoration method, such as spray coating or printing. The manufacture method for decoration film can be categorized into in-side molding decoration (IMD) process and out-side molding decoration process. The steps of these molding process comprise: heating and softing the resin, applying pressure in chamber, applying vacuum, molding and trimming. Moldable substrate, such as PMMA, ABS or PETG, can be used in these molding process, but the physical properties and the chemical resistance of the surface of these moldable substrate are poor. Therefore, it is suggested that the physical properties of the decoration film can be improved by spraying a coating containing volatile organic compounds (VOC) therein or conducting a post curing process. However, the use of volatile organic compounds (VOC) will increase the cost of manufacturing and being less friendly to the environment.

It is known that because of being hard and brittle, the decoration film with higher hardness will be cracked easily due to the stress of elongation during the process of manufacture. For example, the decoration film with metharylate resin can have great physical properties and chemical resistance, but the molding ability will be affected due to being hard and brittle, thus the design will be limited. In addition, for improving the molding ability of the decoration film, it's suggested to apply a coating on the moldable substrate and remove the solvent of the coating without crosslinking or curing step, and then conducting a post curing process after molding process to make the decoration film having desired physical properties and chemical resistance. However, the post curing process will make the manufacturing become complicated.

The present invention is to provide a curable resin composition for decoration film having great molding ability, and a molded decoration film article formed by curing the curable resin composition has satisfied hardness and great chemical resistance without post curing process.

SUMMARY OF THE INVENTION

In an aspect of the present invention is to provide a curable resin composition for decoration film with a great molding ability, and a molded decoration film article having a satisfied hardness and an excellent chemical resistance formed by curing and molding the curable resin composition.

In an aspect of the present invention is to provide a curable resin composition for decoration film comprising: a (meth)acrylic resin, wherein the weight average molecular weight of the (meth)acrylic resin is more than 80,000 and the glass transition temperature (Tg) thereof is more than 80° C.; a reactive (meth)acrylate composition comprising a urethane (meth)acrylate oligomer with a functionality of 6 to 15 and a (meth)acrylate monomer; a first initiator, wherein the first initiator is photoinitiator; and a second initiator, wherein the second initiator is peroxide, azo compound, or the combination thereof; wherein the second initiator is present at an amount of 3 to 23 parts by weight relative to per 100 parts by weight of the reactive (meth)acrylate composition and a ratio of the first initiator to the second initiator is in the range of 1:0.5 to 1:5.

In an embodiment of the present invention, the second initiator is present at an amount of 5 to 22 parts by weight relative to per 100 parts by weight of the reactive (meth) acrylate composition.

In an embodiment of the present invention, the first initiator can be, for example, acetophenones, diphenylketones, propiophenones, dibenzoyl, difunctional α-hydroxyketones, acyl phosphine oxides or combinations thereof.

In an embodiment of the present invention, the first initiator can be, for example, 2,2-dimethoxy-2-benzophenone, cyclohexyl phenyl ketone, 2-hydroxy-2-methyl-1-phenyl-1-propanone, 1-[4-(2-hydroxyethyl oxy)-phenyl]-2-hydroxy-2-methyl-1-prop anone, 2-methyl-1-[4-(methylthio)phenyl]-2-morpholino-1-propanone, 2-benzyl-2-dimethylamino-1-(4-morpholinophenyl)-1-butanone, bis (2,4,6-trimethylbenzoyl) phenylphosphine oxide, 2,4,6-trimethylbenzoyl-diphenyl-phosphine oxide, 4-methylbenzophenone or combinations thereof.

In an embodiment of the present invention, the peroxide can be, for example, hydrogen peroxide, ammonium persulfate, potassium persulfate, benzoyl peroxide, dicumyl peroxide, lauryl peroxide or combinations thereof.

In an embodiment of the present invention, the azo compound can be, such as, azobisisobutyronitrile, azobisisoheptanonitrile, dimethyl azobisisobutyrate or combinations thereof.

In an embodiment of the present invention, the curable resin composition for decoration film comprises 35 to 80 parts by weight of the (meth)acrylic resin and 20 to 65 parts by weight of the reactive (meth)acrylate composition.

In an embodiment of the present invention, the reactive (meth)acrylate composition comprises: 10 to 35 parts by weight of the urethane (meth)acrylate oligomer with a functionality of 6 to 15 and 10 to 30 parts by weight of the (meth)acrylate monomer.

In an embodiment of the present invention, the weight average molecular weight of the urethane (meth)acrylate oligomer with a functionality of 6 to 15 can be in the range of 1,800 to 15,000, and the viscosity (at 25° C.) thereof can be more than 80,000 cps.

In an embodiment of the present invention, the urethane (meth)acrylate oligomer with a functionality of 6 to 15 is an aliphatic urethane (meth)acrylate oligomer with the functionality of 6 to 15.

In an embodiment of the present invention, the (meth) acrylate monomer can be, such as, pentaerythritol tetra (meth)acrylate, dipentaerythritol penta(meth)acrylate (DPP (M)A), dipentaerythritol hexa(meth)acrylate (DPH(M)A), trimethylolpropane tri(meth)acrylate (TMPT(M)A), ditrimethylolpropane tetra(meth)acrylate (DTMPT(M)A), pentaerythritol tri(meth)acrylate (PET(M)A), 2-ethylhexyl (meth)acrylate (2-EH(M)A), 2-hydroxyethyl (meth)acrylate (2-HE(M)A), (3-hydroxypropyl (meth)acrylate (3-HP(M) A), 4-hydroxybutyl (meth)acrylate (4-HB(M)A), 2-butoxyethyl (meth)acrylate, 1,6-hexanediol di(meth)acrylate (HDD (M)A), cyclic trimethylolpropane formal (meth)acrylate (CTF(M)A), 2-phenoxylethyl (meth)acrylate (PHE(M)A), tetrahydrofurfuryl (meth)acrylate (THF(M)A), lauryl (meth) acrylate (L(M)A), diethylene glycol di(meth)acrylate (DEGD(M)A), dipropylene glycol di(meth)acrylate (DPGD (M)A), tripropylene glycol di(meth)acrylate (TPGD(M)A), isobornyl (meth)acrylate or combinations thereof.

In an embodiment of the present invention, the curable resin composition for decoration film can further comprise a leveling agent.

In an embodiment of the present invention, the leveling agent is present in the range of 0.5% to 5% based on the total weight of the curable resin composition.

In a further aspect of the present invention is to provide a decoration film comprising a base film and a coating layer formed thereon, wherein the coating layer is formed by curing the curable resin composition for decoration film as mentioned above.

In a further aspect of the present invention is to provide a molded decoration film article manufactured by molding the decoration film as mentioned above.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylate" used herein refers to acrylate or methacrylate.

In an aspect of the present invention is to provide a curable resin composition for decoration film comprising: a (meth)acrylic resin, a reactive (meth)acrylate composition, a first initiator and a second initiator. Wherein the first initiator is a photoinitiator, and the second initiator is a peroxide, an azo compound or combinations thereof. After the curable resin composition is coated on a substrate, the degree of crosslinking of the resin can be increased during the heating and molding process thereafter by adding the first initiator and the second initiator, so that the hardness and the chemical resistance of the molded decoration film article can be improved.

In an embodiment of the present invention, the second initiator is present at an amount of 3 to 23 parts by weight, and preferably at an amount of 5 to 22 parts by weight relative to per 100 parts by weight of the reactive (meth) acrylate composition. A ratio of the first initiator to the second initiator is in the range of 1:0.5 to 1:5. When the content of the second initiator is excess, the molding ability of the decoration film might be affected. When the content of the second initiator is insufficient, the degree of crosslinking of the curable resin composition might be insufficient, thereby the chemical resistance of the molded decoration film might be affected.

In an embodiment of the present invention, the first initiator can be a photo initiator, such as, acetophenones, diphenylketones, propiophenones, dibenzoyl, difunctional α-hydroxyketones, acyl phosphine oxides or combinations thereof. Specifically, suitable initiator as the first initiator can be but not limited to 2,2-dimethoxy-2-benzophenone, cyclohexyl phenyl ketone, 2-hydroxy-2-methyl-1-phenyl-1-propanone, 1-[4-(2-hydroxyethyl Oxy)-phenyl]-2-hydroxy-2-methyl-1-prop anone, 2-methyl-1-[4-(methylthio)phenyl]-2-morpholino-1-propanone, 2-benzyl-2-dimethylamino-1-(4-morpholinophenyl)-1-butanone, bis(2,4,6-trimethylbenzoyl) phenylphosphine oxide, 2,4,6-Trimethylbenzoyl-diphenyl-phosphine oxide, 4-methylbenzophenone, or combinations thereof.

In an embodiment of the present invention, the peroxide can be but not limited to hydrogen peroxide, ammonium persulfate, potassium persulfate, benzoyl peroxide, dicumyl peroxide, lauryl peroxide or combinations thereof. The azo compound can be but not limited to azobisisobutyronitrile, azobisisoheptanonitrile, dimethyl azobisisobutyrate, or combinations thereof. The peroxide and the azo compound can be used alone or together.

In an embodiment of the present invention, the curable resin composition for decoration film can comprise 35 to 80 parts by weight of the (meth)acrylic resin and 20 to 65 parts by weight of the reactive (meth)acrylate composition. When the content of the (meth)acrylic resin is excess, the hardness and the chemical resistance of the decoration film might be decreased. When the content of the(meth)acrylic resin is insufficient, the molding ability of the decoration film might be affected, thereby cracks might appear on the surface of the decoration film after molding process.

In an embodiment of the present invention, suitable (meth)acrylic resin is thermoplastic (meth)acrylic resin. A weight average molecular weight of the (meth)acrylic resin is more than 80,000 and a glass transition temperature (Tg) thereof is more than 80° C.

In an embodiment of the present invention, the reactive (meth)acrylate composition can comprise 10 to 35 parts by weight of urethane (meth)acrylate oligomer with a functionality of 6 to 15 and 10 to 30 parts by weight of (meth) acrylate monomer.

The weight average molecular weight of the urethane (meth)acrylate oligomer with a functionality of 6 to 15 can be in the range of 1,800 to 15,000, and the viscosity (at 25° C.) thereof can be more than 80,000 cps. In a preferred embodiment of the present invention, the urethane (meth) acrylate oligomer with a functionality of 6 to 15 is an aliphatic urethane (meth)acrylate oligomer with a functionality of 6 to 15.

In the curable resin composition for decoration film of the present invention, suitable (meth)acrylate monomer can be, for example, pentaerythritol tetra(meth)acrylate, dipentaerythritol penta(meth)acrylate (DPP(M)A), dipentaerythritol hexa(meth)acrylate (DPH(M)A), trimethylolpropane tri(meth)acrylate (TMPT(M)A), ditrimethylolpropane tetra (meth)acrylate (DTMPT(M)A), pentaerythritol tri(meth) acrylate (PET(M)A), 2-ethylhexyl (meth)acrylate (2-EH(M) A), 2-hydroxyethyl (meth)acrylate (2-HE(M)A), (3-hydroxypropyl (meth)acrylate (3-HP(M)A), 4-hydroxybutyl (meth)acrylate (4-HB(M)A), 2-butoxyethyl (meth) acrylate, 1,6-hexanediol di(meth)acrylate (HDD(M)A), cyclic trimethylolpropane formal (meth)acrylate (CTF(M) A), 2-phenoxyethyl (meth)acrylate (PHE(M)A), tetrahydrofurfuryl (meth)acrylate (THF(M)A), lauryl (meth)acrylate (L(M)A), diethylene glycol di(meth)acrylate (DEGD(M)A), dipropylene glycol di(meth)acrylate (DPGD(M)A), tripropylene glycol di(meth)acrylate (TPGD(M)A) or isobornyl (meth)acrylate, but not limited thereto. The monomer mentioned above can be used alone or together.

In a preferred embodiment of the present invention, a leveling agent can optionally be incorporated with the curable resin composition for decoration film. The leveling agent incorporated into the curable resin composition for decoration film is used for enhancing the surface coverage and smoothness of the coating layer and thus, the surface of the curable resin composition coating layer obtained after drying and curing can be a smooth one with antifouling and abrasion resistance. The leveling agent suitably used in the present curable resin composition can be, for example, polyether-modified silicone, polyether-modified acrylate, fluorocarbon-modified acrylate or perfluoroalkyl fluoride surfactant or the like. In an embodiment of the present invention, the leveling agent is present in the range of 0.5% to 5% based on the total weight of the curable resin composition.

In a further aspect of the present invention is to provide a decoration film with a great hardness and chemical resistance, which comprise a base film and a coating layer formed thereon, wherein the coating layer is formed by curing the curable resin composition as mentioned above.

Suitable substrates are not particularly limited and can be the substrates commonly used in the related art, such as, for example, polycarbonate film, polymethyl methacrylate film, polystyrene film, polyester film, polyurethane film, polyethylene terephthalate film, polyethylene film, PETG film, ABS resin film or the likes, but not limited thereto.

The method for producing the decoration film of the present invention comprises the steps of: mixing the (meth) acrylate resin, the reactive (meth)acrylate composition, the first initiator, the second initiator and adequate solvent(s) and stirred evenly for preparing an acrylic coating solution; coating the acrylic coating solution on the substrate; drying the solvent(s) and curing by radiation or electron beam for forming a decoration film.

The solvents suitable for preparing the present decoration film can be the organic solvents commonly used in the related art, such as ketones, aliphatic, cycloaliphatic or aromatic hydrocarbons, ethers, esters or alcohols. The acrylic coating solution can use one or one more organic solvents. Suitable solvent can be, such as, acetone, butanone, cyclohexanone, methyl isobutyl ketone, hexane, cyclohexane, dichloromethane, dichloroethane, toluene, xylene, propylene glycol methyl ether, methyl acetate, ethyl acetate, propyl acetate, butyl acetate, n-butanol, isobutanol, isopropanol, diacetone alcohol, propylene glycol methyl ether acetate, cyclohexanol, tetrahydrofuran or the likes, but not limited thereto.

The acrylic coating solution can be applied to the substrate by any usual method in the related art, for example, bar coating, doctor blade coating, dip coating, roll coating, spinning coating, slot-die coating or the likes, but not limited thereto.

In a further aspect of the present invention is to provide a molded decoration film article manufactured by molding the decoration film as mentioned above. In an embodiment of the present invention, the molded decoration film article is manufactured by heating and vacuum molding the decoration film as mentioned above with mold in vacuum forming machine, but not limited thereto.

Compare to the known decoration film has insufficient hardness or be unsatisfied the demand for complex design due to poor molding ability, the decoration film of the present invention has great molding ability and chemical resistance, which can not only satisfy the demand for complex design but also obtain the molded product with a surface which are not easily damaged. Therefore, the decoration film of the present invention suitably be used as the shell of electrical products, such as mobile phone or computer, or as the application of the car interior panel or exterior shell.

The present invention will be described below with reference to Examples to describe the present invention in detail but the present invention is not limited to the description thereof.

EXAMPLE

Example 1

38.46 g of methacrylic resin (M920, weight average molecular weight is about 300,000, Tg is 122° C., commercially obtained from ROHM, Germany), 24.14 g of urethane acrylate oligomer (functionality 6, weight average molecular weight is about 1,900, viscosity is about 87,500 cps (at 25° C.), commercially obtained from IGM, Taiwan), 24.14 g of dipentaerythritol hexaacrylate (DPHA), 3.44 g of photoinitiator (TR-PPI-One, commercially obtained from Tronly New Electronic Materials, Hong Kong), 1.15 g of photoinitiator (Chemcure-BP, commercially obtained from Chembridge, Taiwan), 1.22 g of polyether modified polydimethylsiloxane leveling agent (BYK-3710, commercially obtained from BYK, Germany), 4.83 g of dibenzoyl peroxide (BPO, commercially obtained from ACE Chemical, Taiwan), 100 g of propylene glycol methyl ether (PM) and 300 g of methyl ethyl ketone (MEK) were mixed and stirred for 20 minutes to prepare an acrylic coating solution.

The acrylic coating solution was coated on a polymethylmethacrylate (PMMA) film with a thickness of 80 μm, and then the coated film was heated at 80° C. for 4 minutes and cured by exposing to UV light in a cumulative dosage of 200 mJ/cm$^2$ to obtain a decoration film having a cured coating layer with a thickness of 6 μm formed on the PMMA film.

The decoration film and a tooling for molding were placed in the vacuum forming machine (450DT, commercially obtained from Formech, England), and heated at 160° C. for 15 seconds and vacuumed to pull and distribute the decoration film over the surface of the tooling for molding for vacuum forming process to obtain a molded decoration film article.

The hardness, molding ability and cream resistance of the obtained molded decoration film article were determined. The results were shown in the following table 1.

Example 2

48.25 g of methacrylic resin (MB-7033, weight average molecular weight is about 95,000, Tg is 85° C., commercially obtained from Mitsubishi Chemical, Japan), 24.14 g of urethane acrylate oligomer (functionality 6, weight average molecular weight is about 1,900, viscosity is about 87,500 cps (at 25° C.), commercially obtained from IGM, Taiwan), 24.14 g of dipentaerythritol hexaacrylate (DPHA), 2.41 g of photoinitiator (Chemcure-481, commercially obtained from Chembridge, Taiwan), 1.01 g of polyether modified polydimethylsiloxane leveling agent (BYK-3710, commercially obtained from BYK, Germany), 4.83 g of dibenzoyl peroxide (BPO, commercially obtained from ACE Chemical, Taiwan), 100 g of propylene glycol methyl ether (PM) and 300 g of methyl ethyl ketone (MEK) were mixed and stirred for 20 minutes to prepare an acrylic coating solution.

The acrylic coating solution was coated on a polymethylmethacrylate (PMMA) film with a thickness of 80 μm, and then the coated film was heated at 80° C. for 4 minutes and cured by exposing to UV light in a cumulative dosage of 200 mJ/cm$^2$ to obtain a decoration film having a cured coating layer with a thickness of 6 μm formed on the PMMA film.

The decoration film and a tooling for molding were placed in the vacuum forming machine (450DT, commercially obtained from Formech, England), and heated at 160° C. for 15 seconds and vacuumed to pull and distribute the decoration film over the surface of the tooling for molding for vacuum forming process to obtain a molded decoration film article.

The hardness, molding ability and cream resistance of the obtained molded decoration film article were determined. The results were shown in the following table 1.

Example 3

48.25 g of methacrylic resin (MB-7033, weight average molecular weight is about 95,000, Tg is 85° C., commercially obtained from Mitsubishi Chemical, Japan), 24.14 g of urethane acrylate oligomer (functionality 15, weight average molecular weight is about 13,000, viscosity is about 385,000 cps (at 25° C.), commercially obtained from Miwon, Korea), 24.14 g of dipentaerythritol hexaacrylate (DPHA), 2.41 g of photoinitiator (Chemcure-481, commercially obtained from Chembridge, Taiwan), 1.01 g of polyether modified polydimethylsiloxane leveling agent (BYK-3710, commercially obtained from BYK, Germany), 9.66 g of dibenzoyl peroxide (BPO, commercially obtained from ACE Chemical, Taiwan), 100 g of propylene glycol methyl ether (PM) and 300 g of methyl ethyl ketone (MEK) were mixed and stirred for 20 minutes to prepare an acrylic coating solution.

The acrylic coating solution was coated on a polymethylmethacrylate (PMMA) film with a thickness of 80 μm, and then the coated film was heated at 80° C. for 4 minutes and cured by exposing to UV light in a cumulative dosage of 200 mJ/cm$^2$ to obtain a decoration film having a cured coating layer with a thickness of 6 μm formed on the PMMA film.

The decoration film and a tooling for molding were placed in the vacuum forming machine (450DT, commercially obtained from Formech, England), and heated at 160° C. for 15 seconds and vacuumed to pull and distribute the decoration film over the surface of the tooling for molding for vacuum forming process to obtain a molded decoration film article.

The hardness, molding ability and cream resistance of the obtained molded decoration film article were determined. The results were shown in the following table 1.

Example 4

48.25 g of methacrylic resin (MB-7033, weight average molecular weight is about 95,000, Tg is 85° C., commercially obtained from Mitsubishi Chemical, Japan), 24.14 g of urethane acrylate oligomer (functionality 15, weight average molecular weight is about 13,000, viscosity is about 385,000 cps (at 25° C.), commercially obtained from Miwon, Korea), 24.14 g of dipentaerythritol hexaacrylate (DPHA), 2.41 g of photoinitiator (Chemcure-481, commercially obtained from Chembridge, Taiwan), 1.01 g of polyether modified polydimethylsiloxane leveling agent (BYK-3710, commercially obtained from BYK, Germany), 7.24 g of dibenzoyl peroxide (BPO, commercially obtained from ACE Chemical, Taiwan), 100 g of propylene glycol methyl ether (PM) and 300 g of methyl ethyl ketone (MEK) were mixed and stirred for 20 minutes to prepare an acrylic coating solution.

The acrylic coating solution was coated on a polymethylmethacrylate (PMMA) film with a thickness of 80 μm, and then the coated film was heated at 80° C. for 4 minutes and cured by exposing to UV light in a cumulative dosage of 200 mJ/cm$^2$ to obtain a decoration film having a cured coating layer with a thickness of 6 μm formed on the PMMA film.

The decoration film and a tooling for molding were placed in the vacuum forming machine (450DT, commercially obtained from Formech, England), and heated at 160° C. for 15 seconds and vacuumed to pull and distribute the decoration film over the surface of the tooling for molding for vacuum forming process to obtain a molded decoration film article.

The hardness, molding ability and cream resistance of the obtained molded decoration film article were determined. The results were shown in the following table 1.

Example 5

48.25 g of methacrylic resin (MB-7033, weight average molecular weight is about 95,000, Tg is 85° C., commercially obtained from Mitsubishi Chemical, Japan), 24.14 g of urethane acrylate oligomer (functionality 15, weight average molecular weight is about 13,000, viscosity is about 385,000 cps (at 25° C.), commercially obtained from Miwon, Korea), 24.14 g of dipentaerythritol hexaacrylate (DPHA), 2.41 g of photoinitiator (Chemcure-481, commercially obtained from Chembridge, Taiwan), 1.01 g of polyether modified polydimethylsiloxane leveling agent (BYK-3710, commercially obtained from BYK, Germany), 10.62 g of azobisisobutyronitrile (AIBN, commercially obtained from Taiwan Shirakawa Chemical Industry, Taiwan), 100 g of propylene glycol methyl ether (PM) and 300 g of methyl ethyl ketone (MEK) were mixed and stirred for 20 minutes to prepare an acrylic coating solution.

The acrylic coating solution was coated on a polymethylmethacrylate (PMMA) film with a thickness of 80 μm, and then the coated film was heated at 80° C. for 4 minutes and cured by exposing to UV light in a cumulative dosage of 200 $mJ/cm^2$ to obtain a decoration film having a cured coating layer with a thickness of 6 μm formed on the PMMA film.

The decoration film and a tooling for molding were placed in the vacuum forming machine (450DT, commercially obtained from Formech, England), and heated at 160° C. for 15 seconds and vacuumed to pull and distribute the decoration film over the surface of the tooling for molding for vacuum forming process to obtain a molded decoration film article.

The hardness, molding ability and cream resistance of the obtained molded decoration film article were determined. The results were shown in the following table 1.

Example 6

48.25 g of methacrylic resin (MB-7033, weight average molecular weight is about 95,000, Tg is 85° C., commercially obtained from Mitsubishi Chemical, Japan), 24.14 g of urethane acrylate oligomer (functionality 15, weight average molecular weight is about 13,000, viscosity is about 385,000 cps (at 25° C.), commercially obtained from Miwon, Korea), 24.14 g of dipentaerythritol hexaacrylate (DPHA), 2.41 g of photoinitiator (Chemcure-481, commercially obtained from Chembridge, Taiwan), 1.01 g of polyether modified polydimethylsiloxane leveling agent (BYK-3710, commercially obtained from BYK, Germany), 7.24 g of azobisisobutyronitrile (AIBN, commercially obtained from Taiwan Shirakawa Chemical Industry, Taiwan), 100 g of propylene glycol methyl ether (PM) and 300 g of methyl ethyl ketone (MEK) were mixed and stirred for 20 minutes to prepare an acrylic coating solution.

The acrylic coating solution was coated on a polymethylmethacrylate (PMMA) film with a thickness of 80 μm, and then the coated film was heated at 80° C. for 4 minutes and cured by exposing to UV light in a cumulative dosage of 200 $mJ/cm^2$ to obtain a decoration film having a cured coating layer with a thickness of 6 μm formed on the PMMA film.

The decoration film and a tooling for molding were placed in the vacuum forming machine (450DT, commercially obtained from Formech, England), and heated at 160° C. for 15 seconds and vacuumed to pull and distribute the decoration film over the surface of the tooling for molding for vacuum forming process to obtain a molded decoration film article.

The hardness, molding ability and cream resistance of the obtained molded decoration film article were determined. The results were shown in the following table 1.

Example 7

48.25 g of methacrylic resin (MB-7033, weight average molecular weight is about 95,000, Tg is 85° C., commercially obtained from Mitsubishi Chemical, Japan), 24.14 g of urethane acrylate oligomer (functionality 15, weight average molecular weight is about 13,000, viscosity is about 385,000 cps (at 25° C.), commercially obtained from Miwon, Korea), 24.14 g of dipentaerythritol hexaacrylate (DPHA), 2.41 g of photoinitiator (Chemcure-481, commercially obtained from Chembridge, Taiwan), 1.01 g of polyether modified polydimethylsiloxane leveling agent (BYK-3710, commercially obtained from BYK, Germany), 2.41 g of azobisisobutyronitrile (AIBN, commercially obtained from Taiwan Shirakawa Chemical Industry, Taiwan), 100 g of propylene glycol methyl ether (PM) and 300 g of methyl ethyl ketone (MEK) were mixed and stirred for 20 minutes to prepare an acrylic coating solution.

The acrylic coating solution was coated on a polymethylmethacrylate (PMMA) film with a thickness of 80 μm, and then the coated film was heated at 80° C. for 4 minutes and cured by exposing to UV light in a cumulative dosage of 200 $mJ/cm^2$ to obtain a decoration film having a cured coating layer with a thickness of 6 μm formed on the PMMA film.

The decoration film and a tooling for molding were placed in the vacuum forming machine (450DT, commercially obtained from Formech, England), and heated at 160° C. for 15 seconds and vacuumed to pull and distribute the decoration film over the surface of the tooling for molding for vacuum forming process to obtain a molded decoration film article.

The hardness, molding ability and cream resistance of the obtained molded decoration film article were determined. The results were shown in the following table 1.

Comparative Example 1

48.25 g of methacrylic resin (MB-7033, weight average molecular weight is about 95,000, Tg is 85° C., commercially obtained from Mitsubishi Chemical, Japan), 24.14 g of urethane acrylate oligomer (functionality 6, weight average molecular weight is about 1,900, viscosity is about 87,500 cps (at 25° C.), commercially obtained from Miwon, Korea), 24.14 g of dipentaerythritol hexaacrylate (DPHA), 2.41 g of photoinitiator (Chemcure-481, commercially obtained from Chembridge, Taiwan), 1.01 g of polyether modified polydimethylsiloxane leveling agent (BYK-3710, commercially obtained from BYK, Germany), 100 g of propylene glycol methyl ether (PM) and 300 g of methyl ethyl ketone (MEK) were mixed and stirred for 20 minutes to prepare an acrylic coating solution.

The acrylic coating solution was coated on a polymethylmethacrylate (PMMA) film with a thickness of 80 μm, and then the coated film was heated at 80° C. for 4 minutes and cured by exposing to UV light in a cumulative dosage of 200 $mJ/cm^2$ to obtain a decoration film having a cured coating layer with a thickness of 6 μm formed on the PMMA film.

The decoration film and a tooling for molding were placed in the vacuum forming machine (450DT, commercially obtained from Formech, England), and heated at 160° C. for 15 seconds and vacuumed to pull and distribute the decoration film over the surface of the tooling for molding for vacuum forming process to obtain a molded decoration film article.

The hardness, molding ability and cream resistance of the obtained molded decoration film article were determined. The results were shown in the following table 1.

Comparative Example 2

48.25 g of methacrylic resin (MB-7033, weight average molecular weight is about 95,000, Tg is 85° C., commercially obtained from Mitsubishi Chemical, Japan), 24.14 g of urethane acrylate oligomer (functionality 15, weight average molecular weight is about 13,000, viscosity is about 385,000 cps (at 25° C.), commercially obtained from Miwon, Korea), 24.14 g of dipentaerythritol hexaacrylate (DPHA), 2.41 g of photoinitiator (Chemcure-481, commercially obtained from Chembridge, Taiwan), 1.01 g of polyether modified polydimethylsiloxane leveling agent (BYK-3710, commercially obtained from BYK, Germany), 12.1 g of dibenzoyl peroxide (BPO, commercially obtained from ACE Chemical, Taiwan), 100 g of propylene glycol methyl ether (PM) and 300 g of methyl ethyl ketone (MEK) were mixed and stirred for 20 minutes to prepare an acrylic coating solution.

The acrylic coating solution was coated on a polymethylmethacrylate (PMMA) film with a thickness of 80 μm, and then the coated film was heated at 80° C. for 4 minutes and cured by exposing to UV light in a cumulative dosage of 200 $mJ/cm^2$ to obtain a decoration film having a cured coating layer with a thickness of 6 μm formed on the PMMA film.

The decoration film and a tooling for molding were placed in the vacuum forming machine (450DT, commercially obtained from Formech, England), and heated at 160° C. for 15 seconds and vacuumed to pull and distribute the decoration film over the surface of the tooling for molding for vacuum forming process to obtain a molded decoration film article.

The hardness, molding ability and cream resistance of the obtained molded decoration film article were determined. The results were shown in the following table 1.

Comparative Example 3

33.25 g of methacrylic resin (M920, weight average molecular weight is about 300,000, Tg is 122° C., commercially obtained from ROHM, Germany), 24.14 g of urethane acrylate oligomer (functionality 6, weight average molecular weight is about 1,900, viscosity is about 87,500 cps (at 25° C.), commercially obtained from Miwon, Korea), 24.14 g of dipentaerythritol hexaacrylate (DPHA), 3.44 g of photoinitiator (TR-PPI-One, commercially obtained from Tronly New Electronic Materials, Hong Kong), 1.15 g of photoinitiator (Chemcure-BP, commercially obtained from Chembridge, Taiwan), 1.22 g of polyether modified polydimethylsiloxane leveling agent (BYK-3710, commercially obtained from BYK, Germany), 4.83 g of dibenzoyl peroxide (BPO, commercially obtained from ACE Chemical, Taiwan), 100 g of propylene glycol methyl ether (PM) and 300 g of methyl ethyl ketone (MEK) were mixed and stirred for 20 minutes to prepare an acrylic coating solution.

The acrylic coating solution was coated on a polymethylmethacrylate (PMMA) film with a thickness of 80 μm, and then the coated film was heated at 80° C. for 4 minutes and cured by exposing to UV light in a cumulative dosage of 200 $mJ/cm^2$ to obtain a decoration film having a cured coating layer with a thickness of 6 μm formed on the PMMA film.

The decoration film and a tooling for molding were placed in the vacuum forming machine (450DT, commercially obtained from Formech, England), and heated at 160° C. for 15 seconds and vacuumed to pull and distribute the decoration film over the surface of the tooling for molding for vacuum forming process to obtain a molded decoration film article.

The hardness, molding ability and cream resistance of the obtained molded decoration film article were determined. The results were shown in the following table 1.

Measurement of hardness, molding ability and cream resistance

Measurement of hardness: The molded decoration film article obtained from the Examples and Comparative Examples were measured in accordance with the test of measuring the pencil hardness specified in JIS K5400. The pencil hardness test was performed by a pencil scratch hardness tester (Model: 553-M, manufactured by Yasuda Seiki Seisakusho Ltd., Japan) with a Mitsubishi hardness pencil under a load of 750 g and a movement at a speed of 1 mm/sec. In case that two or more visible scratches were observed on the surface of the test sample, the molded decoration film article was deemed as failure. The maximum hardness used in the hardness test which with no scratch observed on the film surface was recorded.

Molding ability Test: The surface of the molded decoration film article manufacturing by vacuum forming were observed. If no cracks formed on the surface of the test sample, the test sample marked as PASS. If the formation of cracks were observed on the surface of the test sample, the test sample was marked as NG.

Cream resistance: sunscreen cream (SPF50+, commercially obtained from Kanebo, Taiwan) was applied onto the molded decorative film article, and heated at 80° C. for 4 hours. Then, the sunscreen cream on the surface of the molded decorative film article was wiped off by cleanroom wiper and visually observed the surface of the molded decoration film article. If no mark or residue was left on the surface of the test sample and no deformation was found in the test sample, then the test sample was marked as PASS. If mark or residue was left on the surface of the test sample or any deformation was found in the test sample, then the test sample was marked as NG.

TABLE 1

Test results of the molded decoration film articles of Examples and Comparative Examples

| | Pencil Hardness | Molding ability | Cream Resistance |
|---|---|---|---|
| Example 1 | 3 H | PASS | PASS |
| Example 2 | 3 H | PASS | PASS |
| Example 3 | 4 H | PASS | PASS |
| Example 4 | 4 H | PASS | PASS |
| Example 5 | 3 H | PASS | PASS |
| Example 6 | 3 H | PASS | PASS |
| Example 7 | 3 H | PASS | PASS |
| Comparative Example 1 | H | PASS | NG |
| Comparative Example 2 | 3 H | NG | PASS |
| Comparative Example 3 | 3 H | NG | PASS |

As the est results shown in Table 1, the molded decoration film articles obtained from Examples 1 to 7 have not only great hardness and molding ability but also excellent chemical resistance without further post curing process.

While the invention has been described by way of example(s) and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A curable resin composition for decoration film, comprising:

35 to 80 parts by weight of a (meth)acrylic resin, wherein the weight average molecular weight of the (meth)

acrylic resin is more than 80,000 and the glass transition temperature (Tg) thereof is more than 80° C.;

20 to 65 parts by weight of a reactive (meth)acrylate composition, comprising:

10 to 35 parts by weight of a urethane (meth)acrylate oligomer with a functionality of 6 to 15; and 10 to 30 parts by weight of a (meth)acrylate monomer;

a first initiator, wherein the first initiator is a photoinitiator; and a second initiator, wherein the second initiator is a peroxide, an azo compound or combinations thereof;

wherein the second initiator is present at an amount of 3 to 23 parts by weight relative to per 100 parts by weight of the reactive (meth)acrylate composition and a ratio of the first initiator to the second initiator is in the range of 1:0.5 to 1:5.

2. The curable resin composition for decoration film as claimed in claim 1, wherein the second initiator is present at an amount of 5 to 22 parts by weight relative to per 100 parts by weight of the reactive (meth)acrylate composition.

3. The curable resin composition for decoration film as claimed in claim 1, wherein the first initiator is selected from at least one of the group consisting of acetophenones, diphenylketones, propiophenones, dibenzoyl, difunctional α-hydroxyketones and acyl phosphine oxides, or combinations thereof.

4. The curable resin composition for decoration film as claimed in claim 1, wherein the first initiator is selected from at least one of the group consisting of 2,2-dimethoxy-2-benzophenone, cyclohexyl phenyl ketone, 2-hydroxy-2-methyl-1-phenyl-1-propanone, 1-[4-(2-hydroxyethyl Oxy)-phenyl]-2-hydroxy-2-methyl-1-propanone, 2-methyl-1-[4-(methylthio)phenyl]-2-morpholino-1-propanone, 2-benzyl-2-dimethylamino-1-(4-morpholinophenyl)-1-butanone, bis(2,4,6-trimethylbenzoyl) phenylphosphine oxide, 2,4,6-Trimethylbenzoyl-diphenyl-phosphine oxide and 4-methylbenzophenone, or combinations thereof.

5. The curable resin composition for decoration film as claimed in claim 1, wherein the peroxide is selected from at least one of the group consisting of hydrogen peroxide, ammonium persulfate, potassium persulfate, benzoyl peroxide, dicumyl peroxide and lauryl peroxide, or combinations thereof.

6. The curable resin composition for decoration film as claimed in claim 1, wherein the azo compound is azobisisobutyronitrile, azobisisoheptanonitrile, dimethyl azobisisobutyrate, or combinations thereof.

7. The curable resin composition for decoration film as claimed in claim 1, wherein the weight average molecular weight of the urethane (meth)acrylate oligomer with a functionality of 6 to 15 is in the range of 1,800 to 15,000, and a viscosity (at 25° C.) thereof is more than 80,000 cps.

8. The curable resin composition for decoration film as claimed in claim 1, wherein the urethane (meth)acrylate oligomer with a functionality of 6 to 15 is an aliphatic urethane (meth)acrylate oligomer with a functionality of 6 to 15.

9. The curable resin composition for decoration film as claimed in claim 1, wherein the (meth)acrylate monomer is selected from at least one of a group consisting of pentaerythritol tetra(meth)acrylate, dipentaerythritol penta(meth)acrylate (DPP(M)A), dipentaerythritol hexa(meth)acrylate (DPH(M)A), trimethylolpropane tri(meth)acrylate (TMPT(M)A), ditrimethylolpropane tetra(meth)acrylate (DTMPT(M)A), pentaerythritol tri(meth)acrylate (PET(M)A), 2-ethylhexyl (meth)acrylate (2-EH(M)A), 2-hydroxyethyl (meth)acrylate (2-HE(M)A), (3-hydroxypropyl (meth)acrylate (3-HP(M)A), 4-hydroxybutyl (meth)acrylate (4-HB(M)A), 2-butoxyethyl (meth)acrylate, 1,6-hexanediol di(meth)acrylate (HDD(M)A), cyclic trimethylolpropane formal (meth)acrylate (CTF(M)A), 2-phenoxyethyl (meth)acrylate (PHE(M)A), tetrahydrofurfuryl (meth)acrylate (THF(M)A), lauryl (meth)acrylate (L(M)A), diethylene glycol di(meth)acrylate (DEGD(M)A), dipropylene glycol di(meth)acrylate (DPGD(M)A), tripropylene glycol di(meth)acrylate (TPGD(M)A) and isobornyl (meth)acrylate, or combinations thereof.

10. The curable resin composition for decoration film as claimed in claim 1, further comprising a leveling agent.

11. The curable resin composition for decoration film as claimed in claim 10, wherein the leveling agent is present in the range of 0.5% to 5% based on the total weight of the curable resin composition for decoration film.

12. A decoration film, comprising:

a base film; and a coating layer formed on the base film, wherein the coating layer is formed by curing the curable resin composition for decoration film as claimed in claim 1.

13. A molded decoration film article manufactured by molding the decoration film as claimed in claim 12.

* * * * *